United States Patent [19]

King et al.

[11] Patent Number: 4,811,887
[45] Date of Patent: Mar. 14, 1989

[54] FRICTION WELDING

[75] Inventors: Clive G. King; John A. Padilla, both Cambridge; Richard J. Sproulle, Hertfordshire, all of United Kingdom

[73] Assignee: The Welding Institute, Cambridge, England

[21] Appl. No.: 3,132

[22] Filed: Jan. 14, 1987

[30] Foreign Application Priority Data

Jan. 17, 1986 [GB] United Kingdom ............... 8601083

[51] Int. Cl.$^4$ ............................................ B23K 27/00
[52] U.S. Cl. ......................................... 228/2; 228/113
[58] Field of Search ...................... 228/2, 112, 113, 9; 156/73, 5

[56] References Cited

U.S. PATENT DOCUMENTS 3,732,613 5/1973 Steigerwald ..................... 228/2 X
3,735,910 5/1973 Watson et al. .................... 228/2
3,972,465 8/1976 Takaoka et al. .................. 228/2
4,247,346 1/1981 Maehara et al. .................. 228/2 X

FOREIGN PATENT DOCUMENTS 2137774 6/1973 United Kingdom .
1321332 10/1984 United Kingdom .

Primary Examiner—Nicholas P. Godici
Assistant Examiner—Carmine Cuda
Attorney, Agent, or Firm—Martin M. Novack

[57] ABSTRACT

A method and apparatus for friction welding a pair of workpieces (45,46) is described. The apparatus comprises a drive assembly (30) for causing relative motion between the workpieces while urging the workpieces together. A load control assembly (20) is provided which is responsive, at least towards the end of a weld cycle, to the rate of motion of one workpiece relative to the other to cause the workpieces to be urged together under a force which increases as the rate of relative motion decreases.

10 Claims, 13 Drawing Sheets

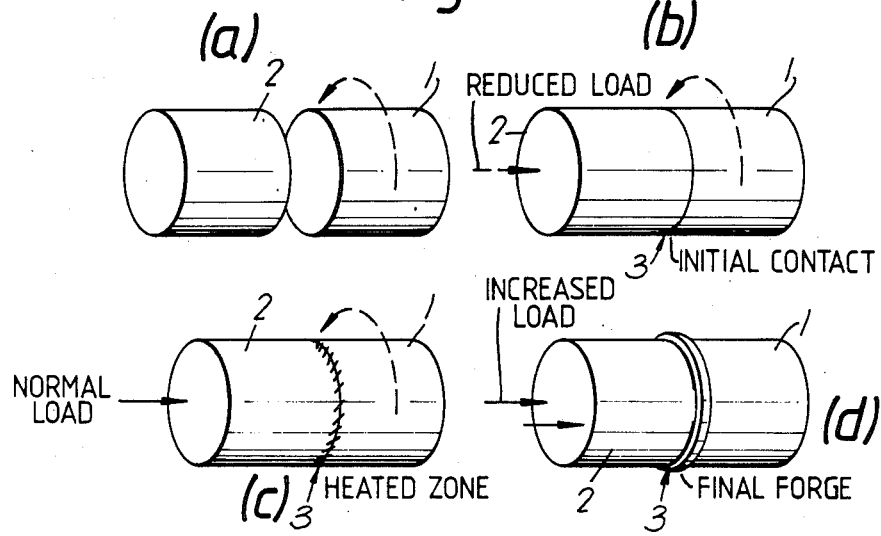
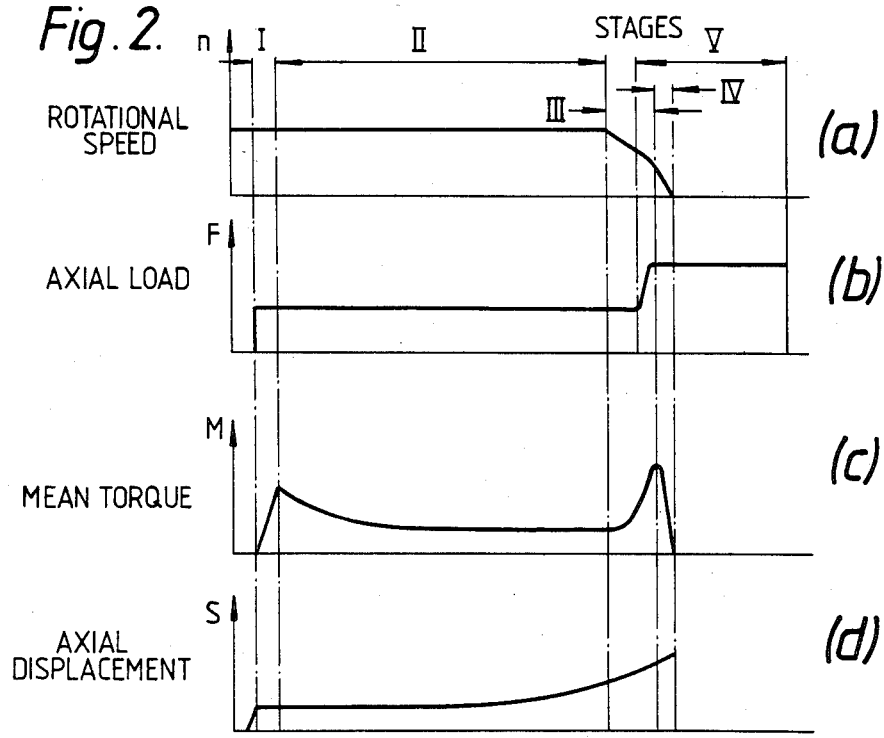

(a) ROTATIONAL SPEED
(b) AXIAL LOAD
(c) MEAN TORQUE
(d) AXIAL DISPLACEMENT

STAGES I, II, III, IV

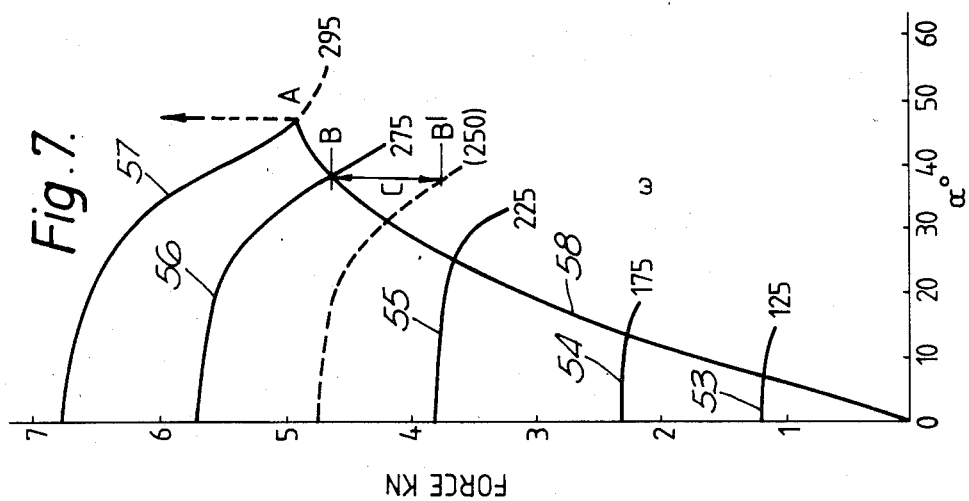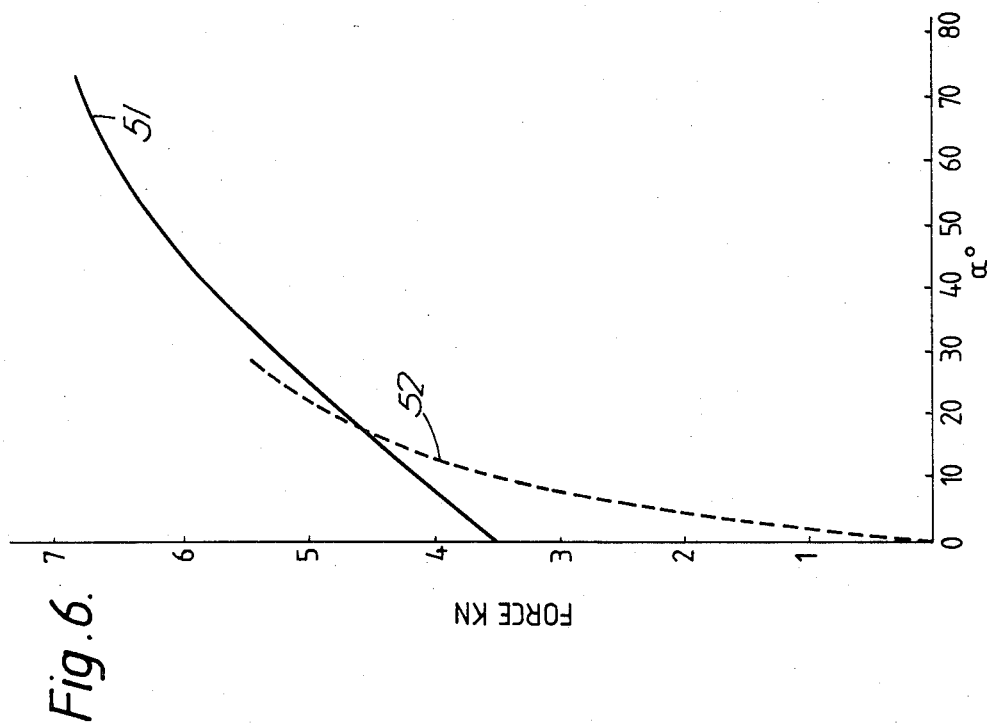

Fig. 8.
(A) 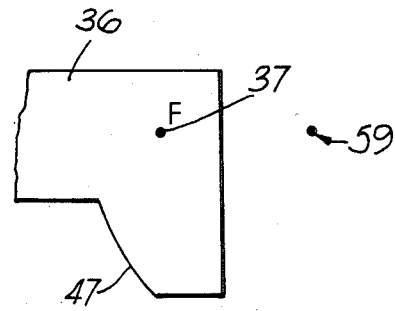
(B) 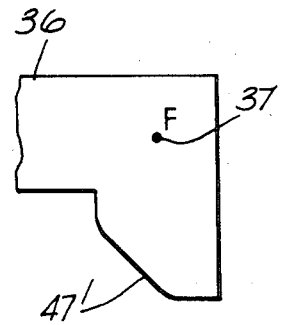
(C) 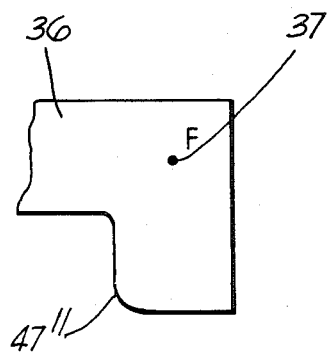

Fig. 14.
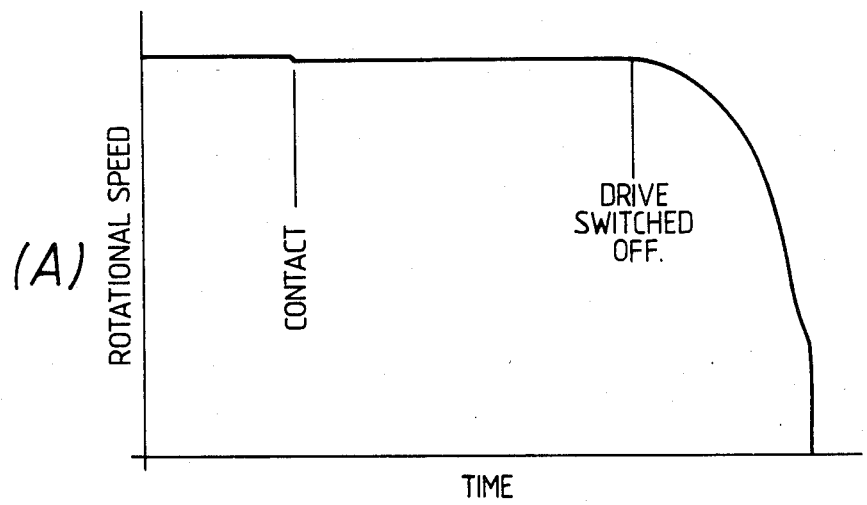
(A)
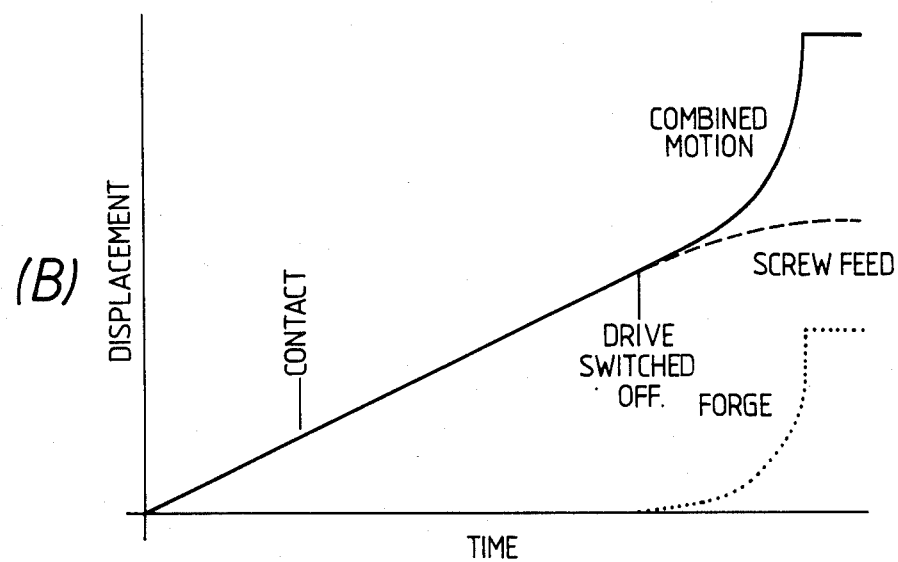
(B)

FRICTION WELDING

FIELD OF THE INVENTION

The invention relates to methods and apparatus for friction welding.

DESCRIPTION OF THE PRIOR ART

In friction welding relative motion is established between two workpieces or components pressed together under load, so as to develop sufficient heat at their common interface to allow the components to be forged together when the motion is arrested. There are many types of friction welding apparatus in which the relative motion is rotary, orbital or vibratory. The latter technique is generally applied to non-metals such as plastics, and is commonly known as vibration welding. This method of joining includes simple to and fro linear motion, as well as part rotary motion or circumferential oscillation while the workpieces are in contact. In one form of orbital welding two rotating components are axially offset, one from the other, to produce low amplitude circular relative motion. However the most common method (and the method generally applied to the friction welding of metals and their alloys) uses simply rotary motion of one axially symmetrical component such as a stud with respect to a stationary component, under an applied axial load, to develop heat at their common interface.

In all these systems an applied load is maintained both during the main frictioning stage in which relative motion is sustained and during the final forging stage when the relative motion is arrested. In one design of friction welding machine, an inertial disc or mass is coupled to the rotating component and allowed to decelerate under a constant applied axial load. Alternatively a drive of approximately constant speed is maintained throughout the frictioning stage but is switched off or declutched to allow the rotating head to stop or be arrested by braking, to terminate the heating phase so that the joint is consolidated under the applied load. The load may also be increased to assist the final forge in conjunction with the arrest of relative motion.

In so-called inertial friction welding, it is common practice to use a constant applied load since, with the short duration welding cycle normally employed, it is difficult to time accurately any sequence of operating loads in co-ordination with the arrest of the rotary mass. Where a constant applied load is used, there is the inherent disadvantage that the applied force may be inadequate to complete the forging stage sufficiently, especially as the interface between the components to be joined is cooling during the period following the cessation of relative motion. On the other hand if a sufficiently large applied force is used to allow for the final forging, then the initial "snatch torque" (when the (cold) components are first brought together) is very high. This can be so excessive as to cause slip of a component in its workholding system, or alternatively to cause it to deform.

Conversely in so-called continuous drive friction welding (where there is better opportunity for a longer duration weld sequence and where the arrest stage is in principle predetermined), it is common practice to have at least two load levels, a lower one for frictioning and a higher level for the forge in conjunction with the arrest of the rotating component. Morever in the continuous drive system, to avoid the initial snatch torque when the components are first brought together, it is feasible to use an even lower initial load followed by the main frictioning load which in turn is followed by the higher forging load. However this requires a loading system which can be varied and which can be accurately timed with respect to the friction welding cycle. This may be difficult particularly with short weld cycles.

The system for applying load generally comprises a pneumatic or more commonly a hydraulic cylinder ram, operating at a pressure which in turn is controlled by electrically operated valves.

SUMMARY OF THE INVENTION

In accordance with one aspect of the present invention, a method of friction welding a pair of workpieces comprises causing relative motion between the workpieces while urging the workpieces together; sensing the rate of relative motion at least towards the end of the weld cycle; and urging the workpieces together under a force which is controlled in response to the sensed rate of relative motion between the workpieces.

In accordance with a second aspect of the present invention, friction welding apparatus for welding a pair of workpieces comprises a drive assembly for causing relative motion between the workpieces while urging the workpieces together; and a load control assembly responsive, at least towards the end of a weld cycle, to the rate of motion of one workpiece relative to the other to cause the workpieces to be urged together under a force which increases as the rate of relative motion decreases.

The invention provides for the desired increase in load (from that used in the frictioning stage to that for the forging stage) which is moreover automatically self-regulated to apply the forge load progressively in the short period (the end of the weld cycle) leading to final cessation of relative motion. This automatic load system can be used alone, or in conjunction with conventional force actuators such as screw feed systems, and may be an integral part of a friction welding machine. The invention can be used in both continuous drive and inertial type friction welding processes. The change in the speed of the relative movement at the end of the main frictioning stage is used to increase the applied load and in particular to provide for a rapid increase in applied load up to the maximum forging level in conjunction with the instant of arrest of motion. In addition the rate of relative movement during the earlier part of a weld cycle can also be monitored so that the axial load is also increased during the frictioning stage as a function of speed of the relative movement.

It should be understood that the speed of the relative movement may be monitored directly or indirectly depending upon the circumstances. When welding small diameter workpieces it is common for the workpiece itself to be rotated at relatively high speed in the order of 1000–5000 rpm. However, in the case of much larger workpieces such as large diameter pipes, much lower rotational speeds are involved down to as low as 60 rpm. Depending upon the form of the load control assembly it may be necessary, particularly in the latter case, to monitor some other moving part of the drive assembly which is undergoing movement at a higher rate.

In some examples, the load control assembly may include an electrical detection system for monitoring the rate of the relative motion so as to control a loading device such as a piston/cylinder arrangement via an electrically operated valve.

In other examples, the load control assembly may be a mechanical arrangement coupled to the drive assembly.

In accordance with a third aspect of the present invention, workpiece load apparatus for use in friction welding apparatus comprises a drive shaft for connection to rotary drive means, the drive shaft being adapted to cause relative rotation between a pair of workpieces; and a load control assembly mounted on the drive shaft and responsive to rotation of the drive shaft to impart a load on the interface between the workpieces related to the rate of rotation of the drive shaft.

This workpiece load apparatus can be constructed as a compact unit which can be connected to any convenient drive such as a lathe. It is particularly suitable for the welding of small workpieces such as studs. In one particularly convenient case, the load control assembly includes a centrifugal mechanism coupled to a rotatable portion of the drive assembly and arranged to move radially outwardly in response to an increase in the speed of rotation of the portion to which it is coupled; and resilient (or compliant) means for providing at least part of the force urging the workpieces together, the centrifugal mechanism being adapted to act on the resilient means in a direction opposite to the urging direction as the centrifugal mechanism moves radially outwardly.

Preferably, the resilient means and the centrifugal mechanism cooperate via a cam/cam follower arrangement.

In one form the load control assembly comprises one or more springs or sets of spring stacks arranged to press together the components to be forged following friction heating. This applied load is offset by means of a centrifugal mechanism comprising masses or weights on at least one (preferably two or more) lever arms rotating about an axis and acting like a spring-loaded governor. At maximum speed of rotation of the rotating portion the load on the components due to the springs alone is at a maximum degree of offset or backoff, and as the speed of rotation decreases the degree of backoff decreases. In one arrangement, compression springs are orientated so as to be able to apply an axial load to the components to be welded during frictioning and forging. Moreover the lever arms of the centrifugal mechanism are oriented such that, when it is rotating, the springs are compressed such that the load on the components to be friction welded would be correspondingly alleviated. Thus the resultant applied force is a function of the rotational speed such that the load on the friction weld reaches a maximum when arrest has taken place. Thus the centrifugal mechanism is used to apply a varying load automatically to the friction weld as desired.

A further advantage of this load control assembly is that during initial acceleration the effective inertia is low (because, in the example above, the lever arms and associated masses of the centrifugal mechanism are close to the axis of rotation) and the starting inertial load on the drive assembly is minimal, allowing a low power prime mover to be utilised. Moreover with the buildup of rotational speed there is a corresponding buildup in the inertial stored energy of the centrifugal mechanism, up to the maximum speed (corresponding to maximum radial extent of the lever arms carrying the inertial masses). This increased inertia is beneficial with regard to the first stage of contact between the components to be friction welded, where snatch torques could otherwise arrest a low power drive. However as already described the applied friction load is at a minimum at this stage so the snatch effect is also minimized.

The load control assembly can be part of a rotating head of the friction welding apparatus, so as to apply a changing load automatically as a function of the rotational speed of the component. (In the case of vibrational welding however where a linear motion is caused, the load control assembly may be coupled to another, rotary, part of the drive assembly.) Furthermore the load control assembly and rotating head may provide sufficient inertia to permit the weld to be executed without further drive. Thus the load control assembly can be accelerated up to the desired speed and the drive declutched prior to the components being brought into initial contact. Thereafter with the falling speed of the rotating head the applied load progressively increases at a rate commensurate with the fall in speed. At the final stage when rotation is rapidly arrested, the applied load on the component simultaneously increases very rapidly to the desired forge level.

Friction welding apparatus according to the invention can be used alone or in conjunction with other force-actuating systems which in particular may be used to control the initial applied load, as desired. Equally, the load control assembly can be preset to present a finite minimum load on the component being friction welded.

It should be appreciated that the invention is applicable to the friction welding of both metals and plastics.

BRIEF DESCRIPTION OF THE DRAWINGS

Methods and apparatus in accordance with the invention will now be described and contrasted with conventional methods with reference to the accompanying diagrams, in which:

FIGS. 1a–1d illustrates the main sequence of operations in making a friction weld between two cylindrical components;

FIGS. 2a–2d show diagrammatically the variation of rotational speed, applied load and operating torque, and axial displacement respectively for a conventional continuous drive friction welding system;

FIG. 6 illustrates graphically the variation of axial force (at a constant speed) of the centrifugal mechanism with crank angle for a constant crank arm length;

FIG. 7 shows the relations between axial force of the centrifugal mechanism and spring force as a function of the crank angle α for a given cam shape and at different rotational speeds;

FIGS. 8A to 8C illustrate three different types of cam shape;

FIGS. 14A, 14B illustrate respectively the variation in rotational speed and displacement with time during a weld cycle performed by the system of FIG. 13.

DETAILED DESCRIPTION OF EMBODIMENTS

In friction welding, one component 1 is rotated (FIG. 1a) and brought into contact (stage I—FIGS. 2, 3) with a stationary component 2 under an applied load (FIG. 1b) which may be less than the main friction load. Rotation and main friction load are maintained while frictioning heat is developed (stage II) at the common interface 3 formed between the two components 1, 2 (FIG. 1c), until finally the rotation is arrested and the applied load maintained at the frictioning level or increased (FIG. 1d) to consolidate the forge weld.

With a continuous drive system, FIG. 2, the speed of rotation is maintained until the weld is to be completed, when the drive is either disconnected or switched off (stage III). In either case the rotation can be arrested more rapidly by applying brakes (stage IV) either to the drive head carrying the rotating component, or to a directly connected part of the rotating system. Commonly a constant applied load is maintained during the main frictioning stage (cf. FIG. 1b and 1c) and increased for the arrest, as in FIG. 1d. The corresponding variation in mean torque and axial displacement is illustrated in FIGS. 2c and 2d, although in practice at the initial stage there are severe short-term torque fluctuations due to a snatch make-and-break at the interface when the components are first brought together. In due course as the interface heats, a quasi-equilibrium is set up where the mean torque falls to a lower level and approaches an asymptotic or equilibrium state. During arrest the torque rises briefly before rotation finally ceases.

Figure 3:
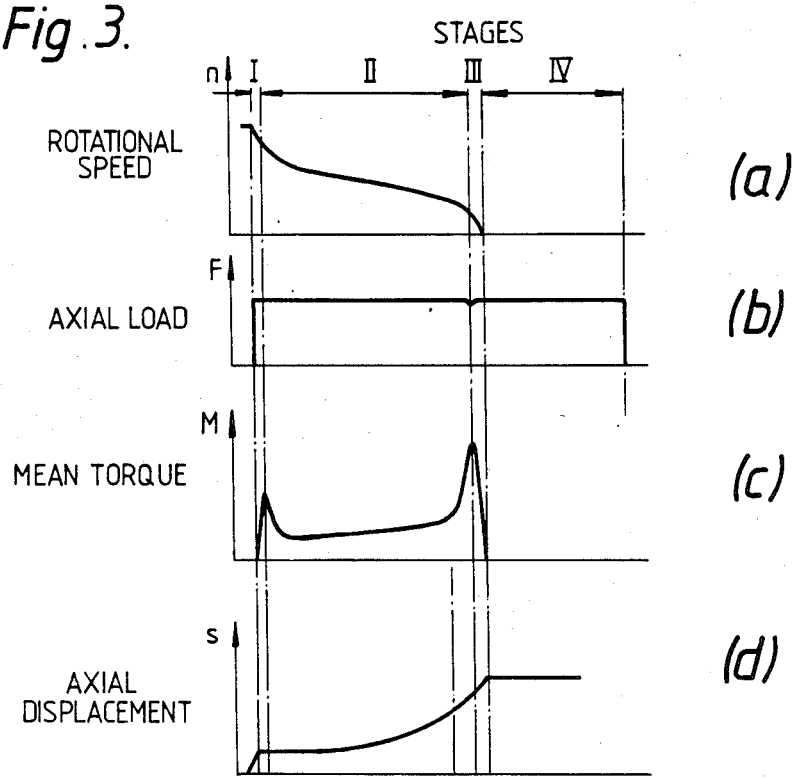
FIGS. 3a–3d are similar to FIGS. 2a–2d but illustrate the variation of the operating parameters for a conventional inertial friction weld.

In inertial welding, FIG. 3, the speed of rotation falls continuously as energy is drawn from the flywheel with a nominally constant applied friction load. The mean torque falls to a minimum (after the initial high level when the component is cold) and then rises again as the speed of rotation falls. Finally the torque rises sharply as the speed falls towards zero. In broad terms inertial friction welding is similar to continuous drive friction welding except that generally a constant applied load is used throughout the weld cycle and of course the rotational speed is decreasing as energy is drawn from the flywheel energy source. The change in axial displacement is also shown in FIG. 3d.

Figure 4:
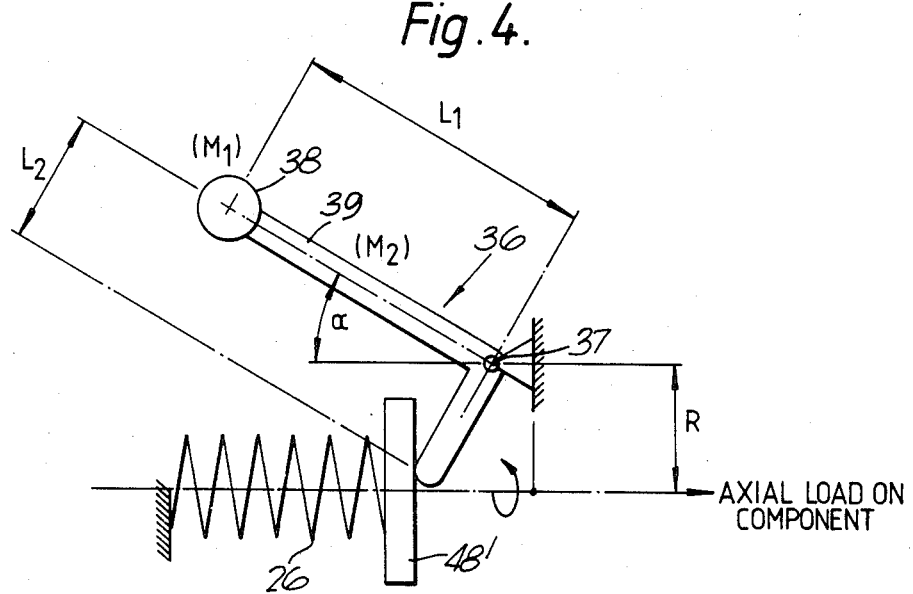
FIG. 4 illustrates diagrammatically part of the load control assembly of an example of apparatus according to the invention.

An example of friction welding apparatus according to the invention is partly illustrated in FIGS. 4 and 5. The friction welding apparatus shown in FIGS. 5A-5C comprises a stationary housing 14 having opposed end walls 15, 16 connected to opposite ends of a cylindrical housing 17. The end wall 15 has a bore 18 coaxial with a bore 19 in the end wall 16. A load control assembly 20 is supported within the casing 14 by thrust bearings 21 in the bore 19 and bearings 22 in the bore 18.

The load control assembly 20 comprises a drive shaft 23 having an integral annular flange 24 positioned within the casing 14 and a portion 25 axially spaced from the flange 24. A flywheel 48 is mounted on the portion 25 for sliding movement along the drive shaft 23. A set of disc springs 26 are mounted around the drive shaft 23 between the annular flange 24 and the flywheel 48.

One end of the drive shaft 23 is non-rotatably coupled to an auxilliary drive shaft 27 which is supported within a bearing assembly 28 mounted to the bore 19 of the end plate 16 and is coupled at 29 in a conventional manner to a drive assembly which forms no part of the present invention. The drive assembly is schematically indicated by a bevel gear 30.

The drive shaft 23 has an integral, first reduced diameter portion 31 with a screw-threaded outer surface which in turn is connected to an integral second reduced diameter portion 32.

A four arm, cruciform holder 33 (best seen in FIG. 5D) having an internally screw-threaded bore 34 is mounted non-rotatably and non-axially movably on the first reduced diameter portion 31 of the shaft 23. Each arm of the holder 33 has a fork 35 in which respective L shaped lever arms 36 are pivoted via pins 37. The free ends of each lever arm 36 support respective bob weights 38. In the position shown in FIG. 5A, the system is at rest and the longer portion 39 of each lever lies alongside the springs 26.

A stud holding mechanism 40 such as a retaining chuck or collet is rotatably and slidably mounted in the bore 18 of the end plate 14 and extends rearwardly to cooperate with segments 35 of the cruciform 33 so as to be non-rotatable relative to the drive shaft 23. The mechanism 40 is bolted to an inner part 48' of the flywheel 48. The mechanism 40 has a blind bore 41 coaxial with the shaft 23 within which is received part of the second reduced diameter portion 32. A second blind bore 42 is provided at a leading end of the mechanism 40 coaxial with the shaft 23 for receiving a stud or other workpiece.

A mounting or fitting 43 is connected to a spigot portion 44 of the end wall 14 to enable the apparatus to be secured to another workpiece.

Before rotation the mechanism 40 is pushed by the springs 26 away from the drive shaft 23 (although it remains supported by the stub extension 32 and mechanically coupled to the drive) as far as the springs are capable of extending. (In this case a stop is provided by the collapse of the arms 36, where they cannot close beyond the limit shown in FIG. 5A, due to the flywheel 48.)

In operation, a stud 45 (FIG. 5B) is mounted in the mechanism 40. The drive 30 is actuated to rotate the shaft 23 and the centrifugal mechanism 20. At speed the assembly 40 carrying the stud 45 is pulled along the portion 32 towards the flange 24 and the springs 26 are compressed. The limit of compression is given by the springs 26 bottoming as illustrated in FIG. 5B, or by the angle of the crank arms 36 reaching 90° to the axis of rotation, or at some intermediate position depending on the shape of cam faces 47 on arms 36 with respect to a compression plate (or cam follower) 48' formed by an inner part of the flywheel 48. (The arms 36 extend through apertures 49 on the flywheel to cause the flywheel to rotate with the arms).

At the desired speed of rotation, the components 45,46 to be friction welded are brought into contact via the mounting 43. Typically, the mounting 43 may comprise an electromagnetic system so that the workpiece 46 is held magnetically to the remainder of the apparatus. The drive 30 after a sufficient period can then be declutched or switched off, so that the rotating stud 45 will begin to slow down. As the rotational speed decreases, so the offsetting precompression of the springs 26 is relaxed and the load applied between the rotating component 45 and the stationary component 46 increased. This is due to the position of the arms 36 changing in dependance on the radial position of the corresponding bob weights 38. As rotation speed decreases the bob weights 38 move in and the springs 26 are decompressed via the crank arms 36. At any one speed an equilibrium is maintained between spring compression and the operating radius of the bob weight. This action progressively develops until, when rotation ceases, the load on the friction welding component reaches the maximum level according to the springs 26. With a simple "flying-bob" mechanism as illustrated in FIGS. 4 and 5, the axial force developed is a function of the square of the rotational speed, the effective radius of the bobweight and the angle of the crank arm to the centre axis. In a simple case where the lengths $L_1$, $L_2$ of each arm of the lever 36 are constant (see the schematic representation in FIG. 4), the axial force F for each mechanism is given by $$F = \omega^2 \frac{L_1}{L_2} \left[ R \left( M_1 + \frac{M_2}{2} \right) + L_1 \sin\alpha \left( M_1 + \frac{M_2}{4} \right) \right]$$

where $\omega$ is the angular speed of rotation, $L_1$ and $L_2$ the lengths of the two portions of the crank lever arm 36, $M_1$ and $M_2$ the masses of the bobweight 38 and the outer main portion of the lever arm respectively, and where R is the radius of the fulcrum 37 for the crank from the axis of rotation. For simplicity the small contribution from the mass of the (shorter) inner part of the crank is neglected. Since the masses are constant the axial centrifugal force at a given speed increases with the angle $\alpha$, as shown by a line 51 in FIG. 6. It should be noted that the force has an initial value due to the first term in the square bracket of the above equation and increases sinusoidally according to the second term.

The reaction force of the spring is also shown in FIG. 6 by a line 52 as a function of the angle $\alpha$ of the crank arm, where to a first approximation the reaction increases directly as $\sin \alpha$ since the degree of compression from the inner part of the lever arm is directly proportional to the axial component of the crank position. However to define a more stable operating point, it is desirable for the curves relating axial centrifugal force and spring force with the angle $\alpha$ to intersect more positively. Thus in a preferred form a cam 47 may be used for the (shorter) inner portions of the lever arms 36, see FIG. 5, where the effective radius $L_2$ of the cam increases with the angle $\alpha$. Thus for a given rotational speed, dimensions and masses of the centrifugal mechanism, the axial force developed is less at high values of the angle $\alpha$ than at low. FIG. 7 shows typical relations between axial centrifugal force (lines 53–57) and spring reaction (line 58) (both with respect to the angle $\alpha$) where the axial centrifugal force overall at a given speed is decreasing (at higher angles of $\alpha$) while the spring reaction is increasing. This gives over a wide operating range, very positive operating points (in terms of axial centrifugal force at a given speed) and hence a defined degree of compression of the springs 26. FIG. 7 illustrates at maximum speed an extreme condition where the springs 26 just approach bottoming under the condition where the spring force is equated by the axial force from the centrifugal mechanism as at point A. (At higher rotational speeds the angle $\alpha$ then remains constant, as the springs cannot be compressed further, although more energy is stored in the centrifugal mechanism due to its rotational inertia.) Conversely at lower rotational speeds an equilibrium angle will be established at a lower value, such as 25°, where the axial centrifugal force is equal and opposite to the spring force but without the spring reaching its maximum compression, as illustrated for $\omega = 225$ rad/sec.

It will be seen that the applied friction load is low or minimal at the start of the welding operation when the rotational speed is high. If a constant speed is maintained, as in continuous drive friction welding, then the applied load remains constant during the main frictioning period. Alternatively in inertial friction welding where the speed is falling then the applied load is simultaneously increasing as the spring compression due to the centrifugal mechanism is being relaxed. In either case as the rotation is being arrested the applied load automatically rises rapidly to the forge level in conjunction with the cessation of relative rotary motion.

For friction welding applications a remanent axial force may be applied to a component, such as a stud, mounted in the rotating head as illustrated in FIG. 5B. The rotating system is brought up to operating speed such that the forge springs 26 are compressed in the desired degree by the action of the centrifugal mechanism. The work is brought into contact with the rotating stud at any desired initial load. This extra load on the spring system causes a small increase in the angle $\alpha$. Alternatively the speed may be decreased slightly such that the centrifugal mechanism relaxes and part of the spring load is carried by the stud making the friction weld. The drive to the rotating head can then be declutched or switched off where, on further speed reduction, an increasing load is applied to the frictioning interface until ultimately, when rotation ceases, the spring force is entirely borne by the friction stud. The spring rate of the springs 26 must be sufficient such that an adequate forge force is maintained in spite of the forging action which results in a shortening of the effective stud length. With a short (high rate) spring the falloff in forge force with displacement is rapid and the system tends to a constant degree of forging or deformation. Alternatively with a long (low rate) spring, there is less reduction in forge force with displacement and deformation continues until the interface zone has cooled sufficiently to withstand the applied load without further significant collapse.

The invention is not limited to any specific cam shape and indeed with different cam profiles different characteristics are obtained. The relationship of axial centrifugal force versus the angle α shown in FIG. 7 is obtained with the simple circular cam profile 47 FIG. 8A, generated by a constant radius from a point 59 offset from the fulcrum F (pivot 37) but in line with the outer crank arm portion. It is noted that for a given speed this gives approximately constant axial centrifugal force against angle in the lower angle range (up to say 25 or 30°), but that the axial centrifugal force falls off rapidly with angle at higher values (above about 30°), in order to intersect the spring curve more positively (so as to provide a precise operating point) in the range where the spring force is not increasing so rapidly with the crank angle α.

It is also noted in this example that the springs bottom at about 47° on the crank arm and hence the reaction force increases instantly at this point A (FIG. 7). The force due to the centrifugal mechanism may also be made approximately constant with angle at this stage as illustrated so that a stable operating point is obtained.

Figure 9:
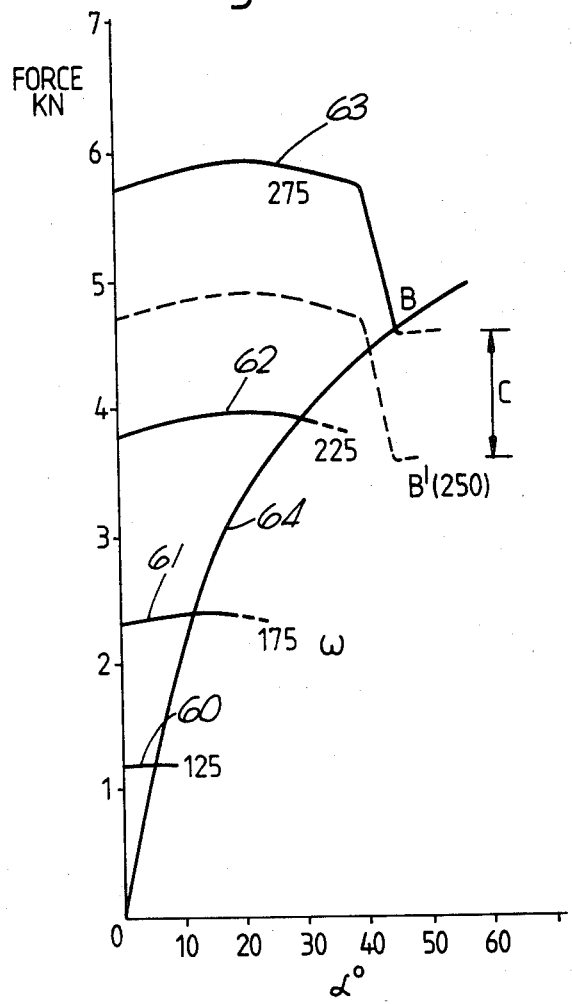
FIG. 9 shows the relation between axial force of the centrifugal mechanism and spring force for a cam such as illustrated in FIG. 8B at different rotational speeds.

With an alternative profile 47' shown in FIG. 8B (with a face of large radius, or substantially flat, between two sections of smaller radius), the axial centrifugal force decreases substantially above a particular value of the angle α, in this case 40°. The relation of axial force (lines 60–63) and spring force (line 64) with angle α are shown in FIG. 9 for the cam profile given in FIG. 8B and for different rotation rates ω. The cam face may have an offset radius, similar to that for the cam illustrated in FIG. 8A, between the two regions of small radius, the centres of which are offset from the line of the outer crank arm.

Figure 10:
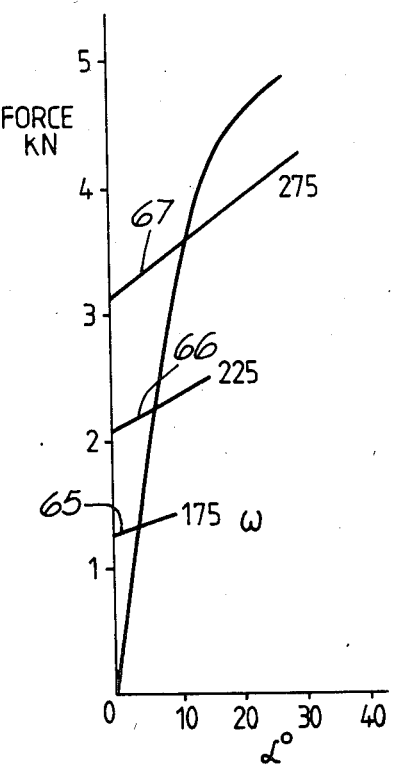
FIG. 10 shows the relations between axial force and spring force for a cam such as illustrated in FIG. 8C at different rotational speeds.

In yet a further arrangement the axial centrifugal force can be made initially to increase by a finite relative amount according to the angle α, as shown by lines 65–67 in FIG. 10 for the simple profile 47" given in FIG. 8C, which comprises a zone of small radius between two zones of much greater radius or even nominally flat.

Figure 11:
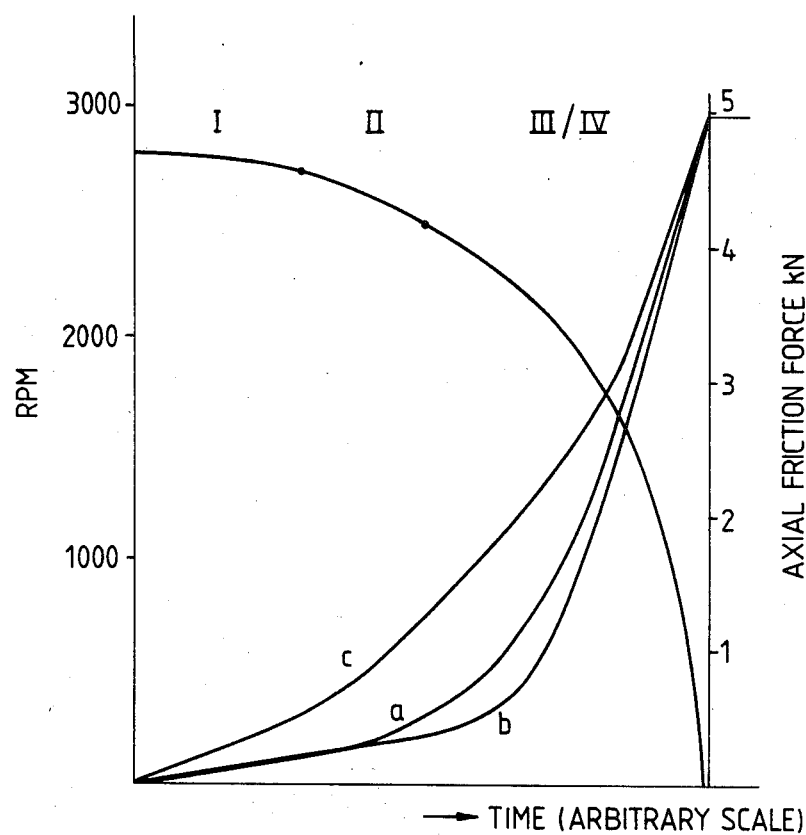
FIG. 11 compares the resultant axial force for the different cam shapes of FIG. 8 as a function of a given speed change.

The various cam profiles for the (shorter) inner arm of the levers 36 result in different patterns of force application during friction welding. These, as already described, are a function of the change in rotation speed from the intercept value given by the intersection of the axial centrifugal force curve with the spring curve. For a given speed variation such as shown in FIG. 11 for the friction head 40, then the offloading of the compressed springs 26 leads to load application to the friction weld as given by the curves a, b and c for the respective cam profiles shown in FIG. 8. As can be seen the initial load applied to the components to be friction welded is low (and in the limit can be substantially zero) with different general degrees of increase during the frictioning period. In this example the degree of increase for the cam profile b is the least and for profile c the most, over the first 10 to 20% speed reduction. During final arrest the force buildup is rapid to the ultimate forging load in the last 50–80% speed change. It is noted that the force buildup for the profile c is less rapid than that of a or b but that the difference is not so great as the difference obtained during the frictioning stage. For example the increase during frictioning for profile c is about three to four times that of profile b but during the forging stage the buildup for the latter is less than about one and half times that for profile c, over the same speed change to arrest.

It is also noted that finite load can be applied to the component to be friction welded by reducing the speed slightly below that where the axial centrifugal force equates the spring force at a given angle α. Thus as indicated in FIGS. 7 and 9 at about 39° and 45° respectively a reduction in speed from ω=275 to ω=250 provides a resultant load C which is applied to the components as an initial contact load. (The magnitude of the contact force C is given by the difference in axial force—where it intercepts the spring force as at the point B, and that for the reduced speed but for the corresponding angle as indicated by the point B'.).

It should be noted that the total inertial content of the centrifugal mechanism may be sufficient to execute the weld, particularly for smaller diameter and especially tubular components. On the other hand for larger components, if the total inertial content of the rotating masses is itself inadequate, then some degree of additional inertia and/or drive is required to prevent the overall weld cycle from being too short in duration, and leading to insufficient heating at the frictioning interface.

The invention is particularly appropriate for mass production of given component assembly, where the requirements for frictioning are thus constant and an appropriate choice of centrifugal weights, rotational speed, spring strength and length, and cam profile can be predetermined. In given applications a very small compact friction head can be developed (as shown in FIG. 5C), in which the centrifugal mechanism including the rotating head is separately brought up to operating speed and then allowed to run down to execute for example a desired stud weld in situ. In this case the centrifugal mechanism may be encased in a non-magnetic non-conducting or non-metallic enclosure and accelerated by a rotating field in the manner of a rotor of an induction motor system. At the operating speed the stored energy and spring compression are at their maxima, and the non-metallic pot containing the centrifugal mechanism can be placed in regions of restricted access. As the rotational speed decreases the frictioning component is brought into contact with the work and suitable load developed. Finally, when rotation ceases, the load is sufficient for forging according to the springs 26 without necessitating a separate force actuator.

This compact arrangement where the applied force is derived from the rotational speed of the friction head permits more versatile utilisation of the friction welding process. Thus it can (at least for small components) be considered as a mobile system which can be manipulated to make friction welds in situ. One example is the handling of a compact friction welding head by means of a robot. Thus the robot could in effect be used to insert a stud into the head, take the assembly to suitable rotating means (such as a simple direct drive or even a rotating electric field) and place the rotating head where desired so that the stud is friction welded onto the component body. Since the thrust developed by heavy duty robot systems is limited, additional means are required to react the forces arising from the friction head as it decelerates. Mechanical clamping can be provided, or the friction head can be supported by a thrust member which reacts against a back stop which may be part of the robot support structure, or part of the component assembly. Furthermore other support means can be used such as electromagnets or even electrically controlled permanent magnets (which can be turned on or off by electrical pulses).

An example in which a square stud was welded to a larger diameter shaft will now be described.

This weld was carried out using the inertial form of friction welding. In this case, FIG. 12A and 12C the speed initially falls slowly (under stray frictional losses) and the stud begins to advance until it contacts the work. At this point a moderate degree of torque is generated, FIG. 12B (and the speed falls more rapidly, region a, FIG. 12A), which increases steadily to a nominally constant value, or first plateau. The rotational speed here (region b, FIG. 12A) decreases rapidly (as a result of this torque) at an approximately constant rate during this plateau. The corresponding rate of displacement, FIG. 12C, although continuously increasing as the interface heats and the material softens, is of the order of 1 mm per second, which is suitable for example for mild steel. Finally, as the rotation approaches rapid arrest, the torque rises to a higher value peak and the displacement also rapidly increases.

It is noted in this example the the forge rate is some 10–20 times greater than the average friction rate of displacement. This is to be contrasted with conventional friction welding where, under a constant applied load as in inertia welding. The forge rate of displacement is some 50% greater than for the frictioning stage (see FIG. 3). Alternatively where there is a rapid increase in the applied load, as can be used in continuous drive friction welding, FIG. 2, the forge displacement rate may be some two or three times the prior frictioning displacement rate.

Figure 12:
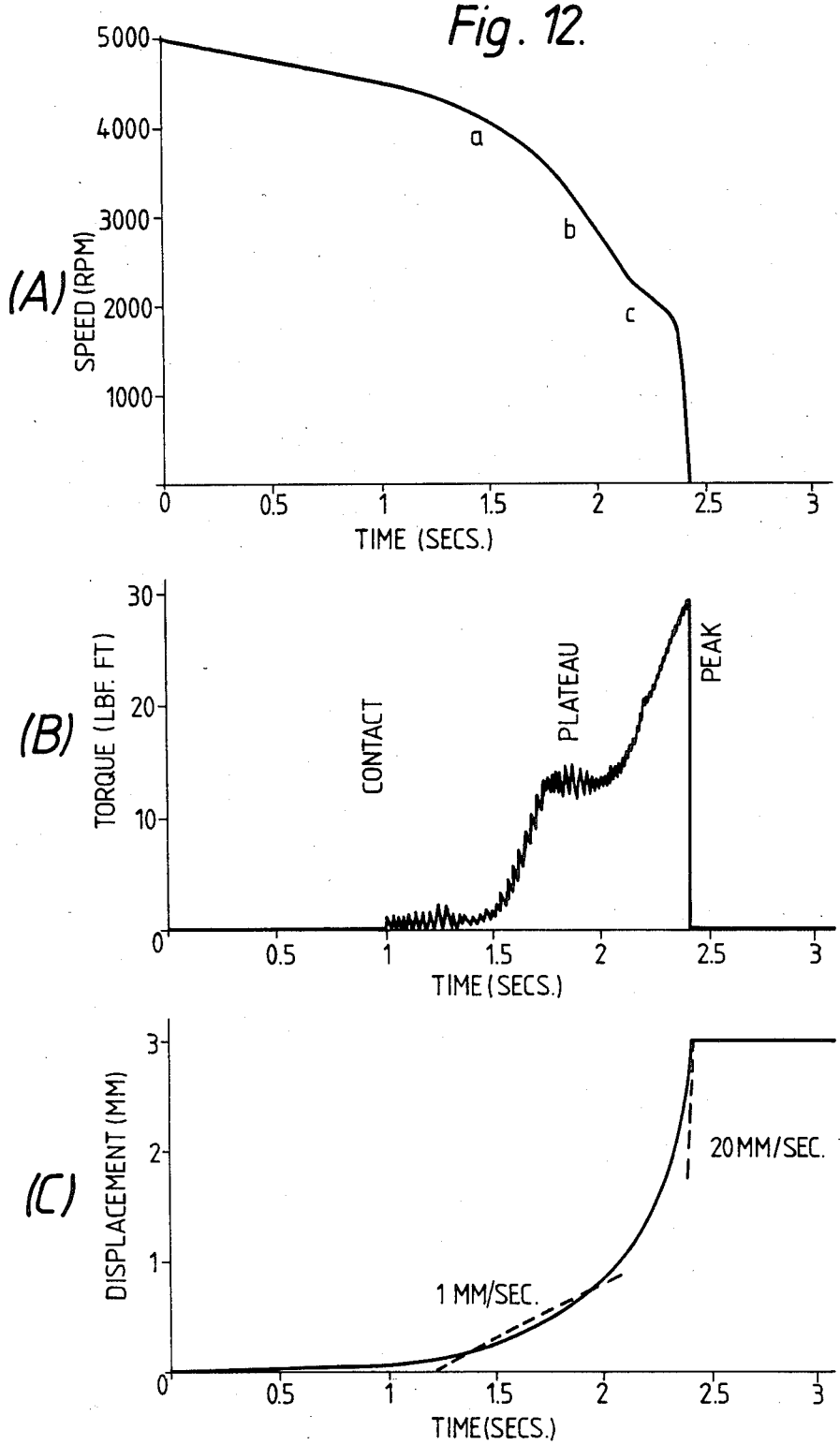
FIGS. 12A-12C illustrate the variation in rotational speed, torque and displacement with time for a typical weld cycle using the apparatus shown in FIGS. 5A-5E.

Another feature of interest is the low initial torque, FIG. 12B, since the applied force at this stage is low, whereas in both conventional continuous drive and inertial friction welding there is a substantial initial torque peak unless additional steps are taken to reduce the initial applied load as already discussed. Furthermore, as illustrated in this example during the frictioning-cum-forge intermediate stage (where the rotational speed is rapidly falling), there is a possibility for there to be a limited period in which the speed is not falling as rapidly as would normally be expected. This is shown in region c, FIG. 12A where, in spite of the increase towards peak operating torque, FIG. 12B the speed is falling less rapidly than for the immediately preceding stage, b, for which the torque is approximately constant.

Figure 5A:
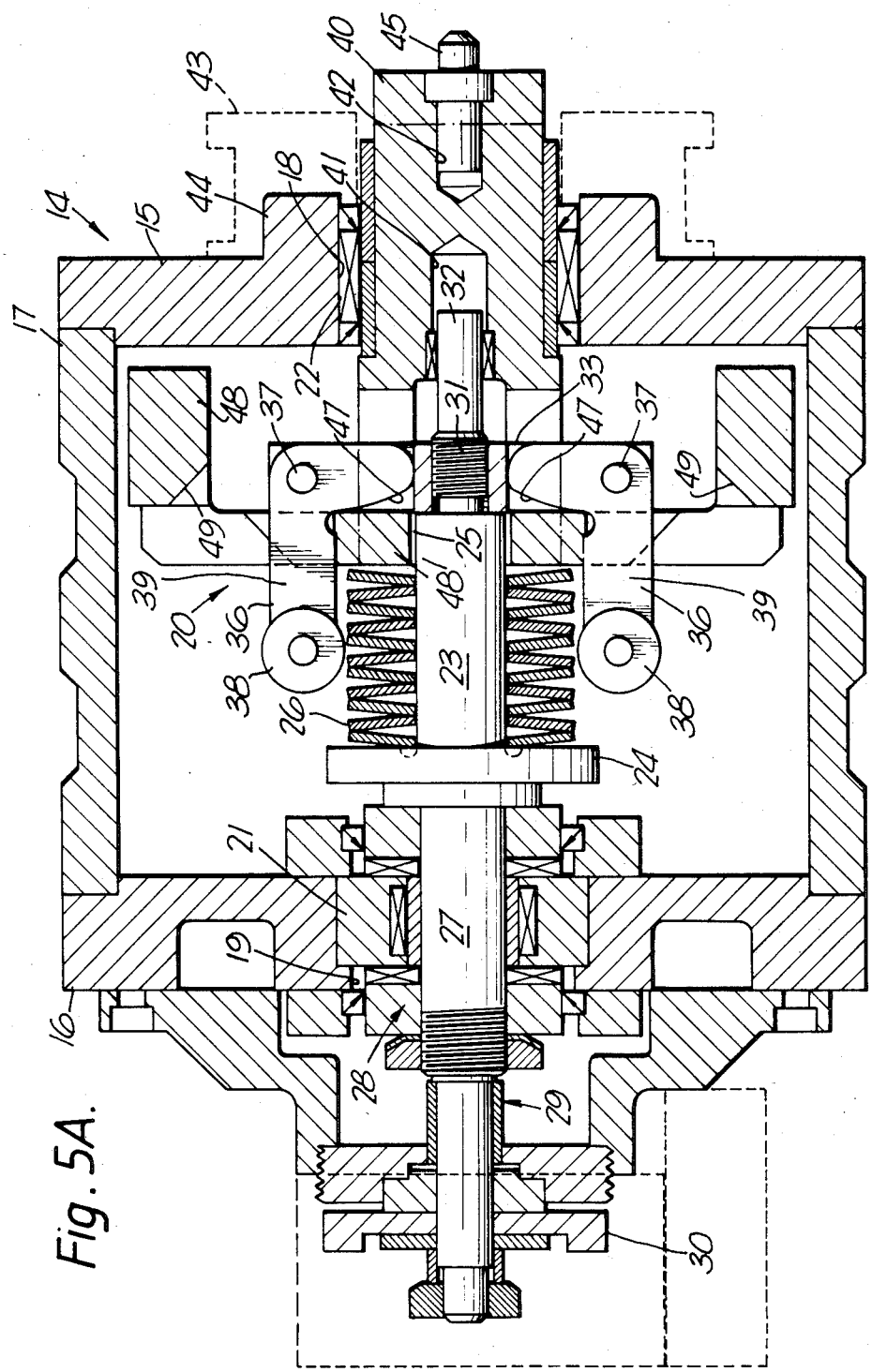
FIGS. 5A and 5B illustrate a welding head of an inertial welding system incorporating a spring-loaded centrifugal mechanism at zero speed and full speed respectively.
Figure 5B:
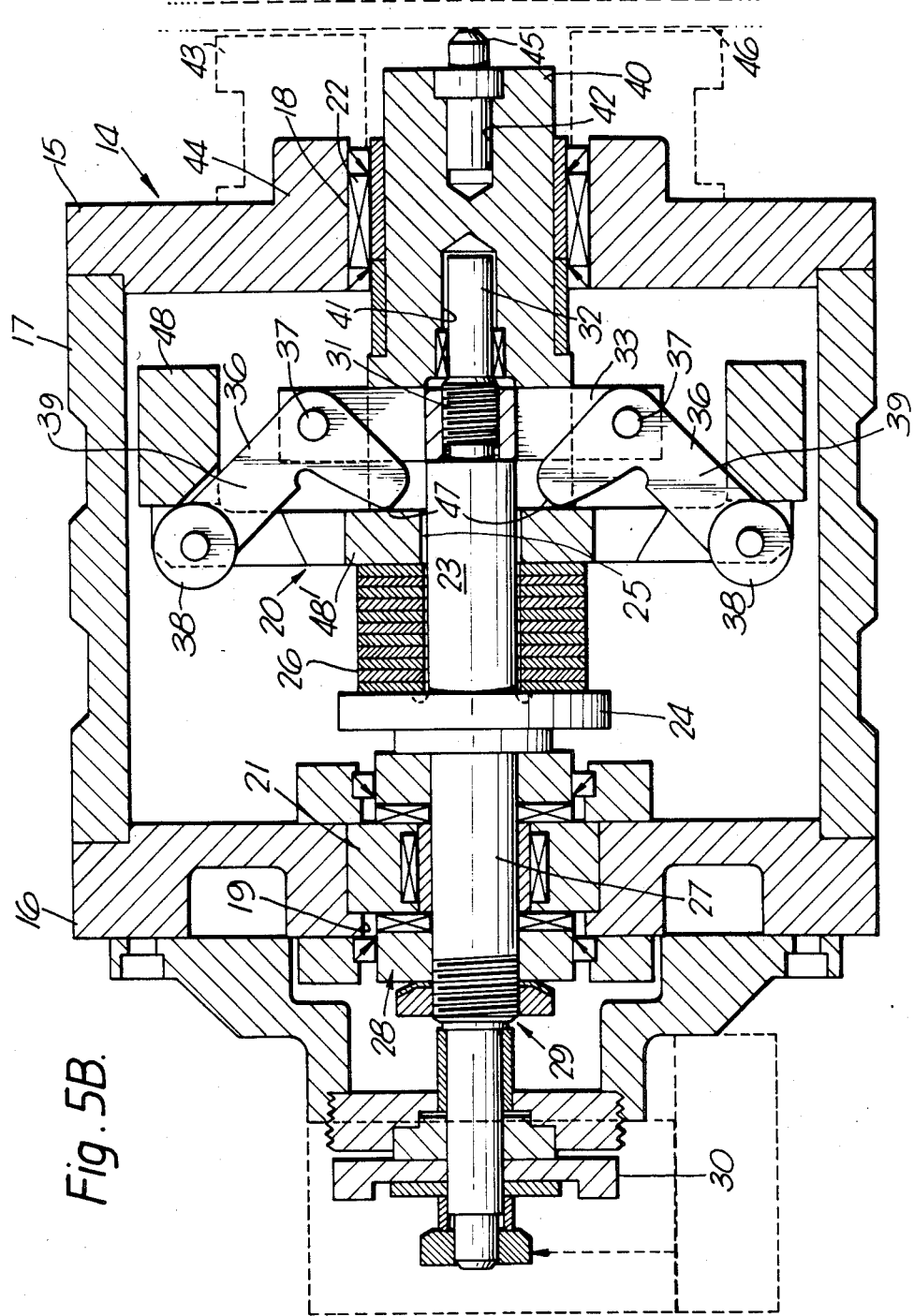
Figure 5C:
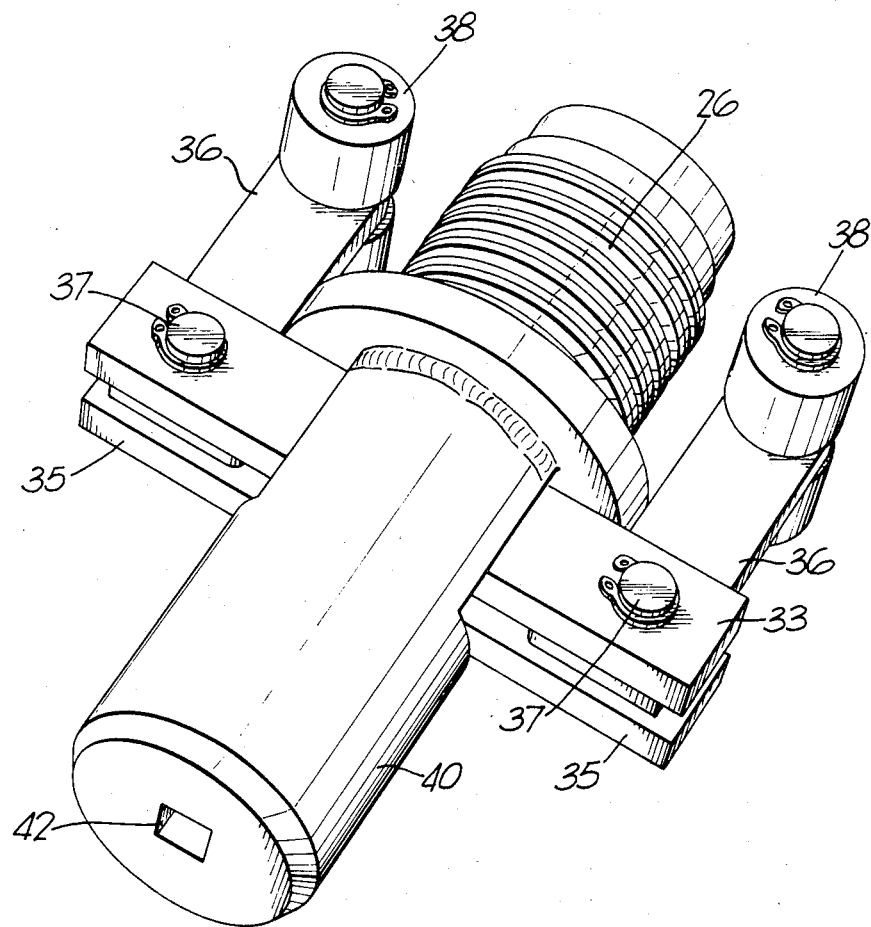
FIG. 5C is a perspective view of the workpiece load apparatus shown in FIGS. 5A and 5B with the flywheel omitted.
Figure 5D:
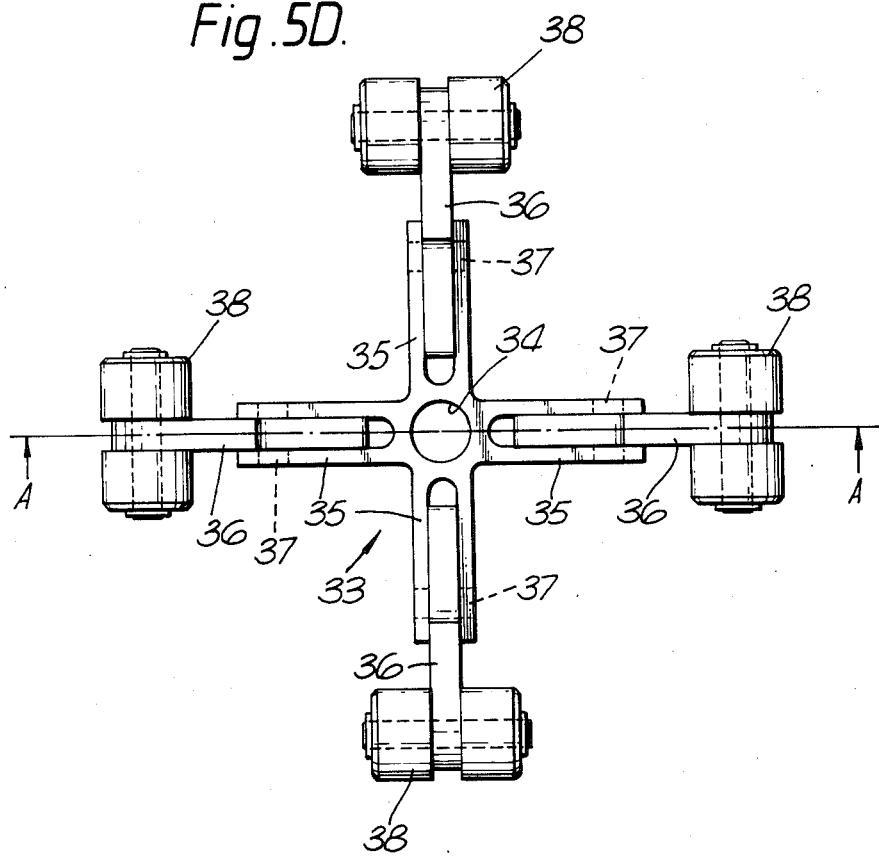
FIG. 5D is a plan of part of the centrifugal mechanism.
Figure 5E:
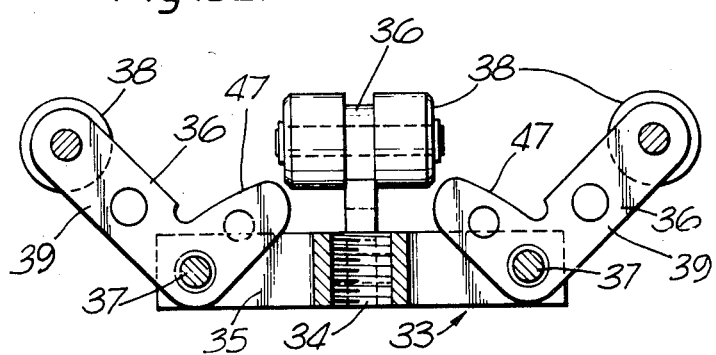
FIG. 5E, is a section taken on the line A—A in FIG. 5D.

This phenomena is associated with the return of the radial bob weights 38 to their neutral or closed position (FIG. 5A). Here the mechanical resistance of the weld region to axial displacement has resulted in the radial position of the bob weights remaining extended, in spite of the falling speed, until further softening in the weld zone has taken place. With the collapse of the bob weights from their extended radial position to that corresponding to the reduced rotational speed, there is a tendency for the speed to increase in order to satisfy the energy equilibrium. This tendency is exhibited as a reduction in the rate of fall of speed otherwise expected. In an extreme case it is possible for the speed even to increase momentarily, due to the axial spring load causing a sudden collapse and extrusion of material from the weld zone and hence a corresponding sudden decrease in the radial position of the flying bob weights.

For larger weldments, and to obtain a greater degree of heat soak between the components being joined, the speed of the drive can be maintained at a suitable level— as in continuous drive friction welding. In this case the relative position of the components being welded can be continuously decreased using any convenient actuator (such as by a hydraulic ram moving the components together) or by means of a screw driven at a suitable rate. An example of a screw feed system for friction welding is given in UK patent No. 1,321,332.

Figure 13:
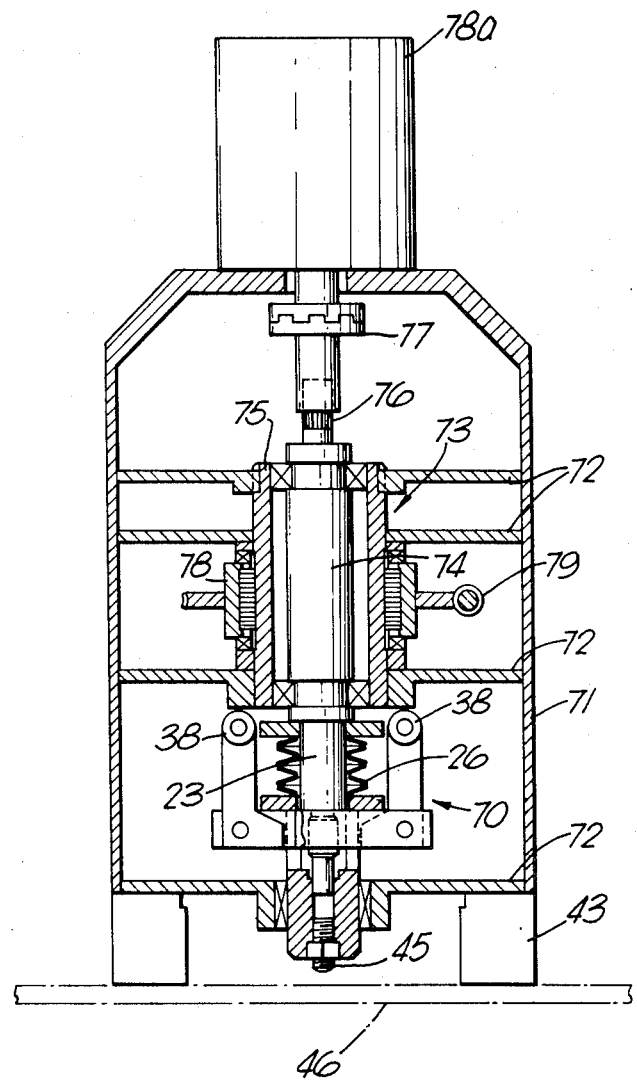
FIG. 13 illutrates an example of a screw feed system incorporating a workpiece load apparatus according to the invention.

FIG. 13 illustrates an example of a screw feed welding system in which a centrifugal mechanism similar to the load control assembly 20 of FIG. 5 is mounted. The centrifugal mechanism is indicated by reference numeral 70. The screw feed apparatus comprises a housing 71 having a number of axially spaced webs 72 which support a screw feed mechanism 73 and the centrifugal mechanism 70. The screw feed mechanism 73 has a shaft 74 rotatably mounted within a cylindrical sliding housing 75, one end of the shaft 74 being connected with the shaft 23 of mechanism 70 and the other end terminating in a splined connection 76 coupled with a clutch 77. The clutch is driven by a motor 78a mounted to the housing 71. The screw feed mechanism 73 also has a roller screw 78 rotatably mounted about housing 75 and driven via a spur drive 79 connected to a motor (not shown). Rotation of the spur drive 79 causes rotation of the roller screw 78 which in turn causes axial movement of the housing 75 and hence the shaft 74. The apparatus is mounted to a workpiece (plate) 46 by a mounting 43.

In use, the shaft 74 is brought up to speed until the springs 26 of mechanism 70 bottom. Alternatively, the speed could be increased until the flying bob weights 38 reach an outer limit, in which case the springs 26 though compressed may still be compliant.

The forward feed is then initiated by driving the roller screw 78 at a nominally constant speed. The centrifugal mechanism 70 containing the flying bob weights 38 and compressed springs 26 moves forward until the stud 45 engages the plate 46. With continuous drive and steady forward feed there is a substantial peak torque, since the components to be friction welded are not sufficiently heated to permit normal extrusion from the interface. This initial peak torque can be limited by reducing the advance rate of the screw mechanism 73 at this stage and/or by providing a reduced section or chamfer on the components to be friction welded. Also, if the springs 26 are not fully compressed there is degree of compliance which assists in reducing the magnitude of the initial torque peak at touch down.

After the initial stage, as the interface between the components 45,46 heats up, a steady advance of the stud 45 being friction welded is maintained by the screw mechanism 73. In one particular arrangement, the drive to the screw could be derived from the rotation of the friction welding head.

When sufficient heat is developed, the drive to the screw mechanism 73 is disconnected or switched off and the centrifugal mechanism 70 is allowed to come to rest as in conventional inertial welding. At this stage, the forging action takes place, as in the FIG. 5 example.

It should be noted that where the forward feed is coupled to the rotation of the friction welding head then the feed itself automatically reduces as the rotating head slows down, while at the same time the forging motion (due to the centrifugal mechanism 70) is urging the component to be friction welded forward. Matching of these two motions is not critical and the steady forward motion of the screw feed is supplemented by the increasing rate of movement due to the forging action of springs 26 together with the collapse of the flying bob weights 38 with the arrest of the rotating head.

This combination of motions is illustrated in FIGS. 14A and 14B, where the dashed line indicates the forward motion of the screw feed mechanism 73 to the rotating head, and the dotted line represents the forward motion of the forge mechanism 70.

We claim:

1. Friction welding apparatus for welding a pair of workpieces, the apparatus comprising a drive assembly for causing relative motion between said workpieces while urging said workpieces together, said drive assembly having a rotatable portion; and a load control assembly responsive, at least towards the end of a weld cycle, to the rate of motion of our workpiece relative to the other to cause said workpieces to be urged together under a force which increases in response to a decrease in said rate of relative motion, said load control assembly comprising resilient means for providing at least part of said force urging said workpieces together, and a centrifugal mechanism mounted for rotation with said rotatable portion of said drive assembly and arranged to move radially outwardly in response to an increase in the speed of rotation of said portion to which it is coupled and to apply a force on said resilient means in a direction opposite to said urging direction, said force being related to said rate of rotation of the mechanism.

2. Apparatus according to claim 1, wherein said centrifugal mechanism comprises a support non-rotatably mounted on said rotatable portion; and at least one arm pivoted to said support, said arm being pivotable towards and away from said rotatable portion in response to a decrease or increase respectively in the rate of rotation of said rotatable portion, said arm defining an inner end, said inner end of said arm applying said opposing force on said resilient means.

3. Apparatus according to claim 2, wherein said resilient means and said inner end of said arm cooperate via an engaging cam and cam follower arrangement, one of said cam and said cam follower being coupled to said arm and the other of said cam and said cam follower being coupled with said resilient means for movement therewith, said cam being shaped to obtain a predetermined workpiece load profile.

4. Apparatus according to claim 2, wherein said at least one arm defines an outer end, said outer end of said arm carrying a weight.

5. Apparatus according to claim 2, wherein said arm is L shaped.

6. Workpiece load apparatus for use in friction welding apparatus, said workpiece load apparatus comprising a drive shaft being adapted to cause relative rotation between a pair of workpieces; and a load control assembly mounted to said drive shaft and responsive, at least towards the end of a weld cycle, to rotation of said drive shaft to impart a load on the interface between said workpieces related to said rate of rotation of said drive shaft, said load control assembly causing said load to increase in response to a decrease in said rate of rotation of said drive shaft, said load control assembly comprising resilient means for providing at least part of said force urging said workpieces together, and a centrifugal mechanism mounted for rotation with said drive shaft of said drive assembly and arranged to move radially outwardly in response to an increase in the speed of rotation of said shaft to which it is coupled and to apply a force on said resilient means in a direction opposite to said urging direction, said force being related to the rate of rotation of said mechanism.

7. Apparatus according to claim 6, wherein said centrifugal mechanism comprises a support non-rotatably mounted on said drive shaft; and at least one arm pivoted to said support, said arm being pivotable towards and away from said drive shaft in response to a decrease or increase respectively in the rate of rotation of said drive shaft, said arm defining an inner end, said inner end of said arm applying said opposing force on said resilient means.

8. Apparatus according to claim 7, wherein said resilient means and said inner end of said arm cooperate via an engaging cam and cam follower arrangement, one of said cam and said cam follower being coupled to said arm and the other of said cam and said cam follower being coupled with said resilient means for movement therewith, said cam being shaped to obtain a predetermined workpiece load profile.

9. Apparatus according to claim 7, wherein said at least one arm defines an outer end, said outer end of said arm carrying a weight.

10. Apparatus according to claim 7, wherein said arm is L shaped.

* * * * *